United States Patent
Bennia-Latreche

(10) Patent No.: US 6,916,212 B2
(45) Date of Patent: Jul. 12, 2005

(54) COMB AND A METHOD FOR MAKING A BRANCH CONNECTION TO PREEXISTING CABLING

(75) Inventor: Karim Bennia-Latreche, Tournefeuille (FR)

(73) Assignee: France Telecom, Paris (FR)

( * ) Notice: Subject to any disclaimer, the term of this patent is extended or adjusted under 35 U.S.C. 154(b) by 56 days.

(21) Appl. No.: 10/291,693

(22) Filed: Nov. 12, 2002

(65) Prior Publication Data

US 2003/0092311 A1 May 15, 2003

(30) Foreign Application Priority Data

Nov. 13, 2001 (FR) .......................................... 01 14677

(51) Int. Cl.[7] .............................................. H01R 9/22
(52) U.S. Cl. ...................... 439/709; 439/507; 439/922
(58) Field of Search .............................. 439/709, 922, 439/49, 507, 509, 511, 513; 379/327

(56) References Cited

U.S. PATENT DOCUMENTS

| | | | | |
|---|---|---|---|---|
| 1,819,302 A | * | 8/1931 | Rah ............................ 218/91 |
| 3,535,463 A | * | 10/1970 | Trucco ....................... 379/327 |
| 3,627,942 A | * | 12/1971 | Bobb ....................... 200/51.07 |
| 3,720,778 A | * | 3/1973 | Woertz et al. ................ 174/59 |
| 4,156,119 A | | 5/1979 | Matthews |
| 4,313,147 A | * | 1/1982 | Uchida et al. .............. 361/119 |
| 4,365,856 A | * | 12/1982 | Yaegashi et al. ............ 439/497 |
| 4,606,595 A | * | 8/1986 | Dola .......................... 439/404 |
| 5,064,380 A | * | 11/1991 | Dale et al. .................. 439/113 |
| 5,454,731 A | * | 10/1995 | Dickie ........................ 439/484 |
| 5,476,388 A | | 12/1995 | Rutkowski |
| 6,361,333 B1 | * | 3/2002 | Cash, Jr. ..................... 439/106 |
| 6,410,869 B1 | * | 6/2002 | McNutt .................... 200/51 R |

FOREIGN PATENT DOCUMENTS

| | | |
|---|---|---|
| EP | 0 485 245 A2 | 5/1992 |
| WO | WO 98/31157 | 7/1998 |

* cited by examiner

*Primary Examiner*—Neil Abrams
(74) *Attorney, Agent, or Firm*—Young & Thompson

(57) ABSTRACT

A comb for making a branch connection to preexisting cabling in an information transmission network includes branch connection plugs fitted with contact fingers suitable for being inserted in an electrical junction strip for connecting the preexisting cabling to branch cabling. The electrical junction strip is designed to establish electrical continuity between inlet electrical cabling and outlet electrical cabling. The comb has at least two branch connection plugs secured to a single fixing plate, and handle means for said fixing plate. The junction strip includes jumpers used to provide continuity between inlet and outlet cabling. The branch connection plugs are used to redirect circuitry to branch cabling and following their insertion, the jumpers may be removed so that input lines are connected solely to branch lines.

25 Claims, 3 Drawing Sheets

COMB AND A METHOD FOR MAKING A BRANCH CONNECTION TO PREEXISTING CABLING

The present invention relates to a comb for making a branch connection to preexisting cabling in an information transmission network. More precisely, the invention relates to a comb for making a branch connection to preexisting cabling in an information transmission network, said comb comprising branch connection plugs fitted with contact fingers suitable for being inserted in an electrical junction strip for connecting the preexisting cabling to branch cabling, said electrical junction strip being designed to establish electrical continuity between inlet electrical cabling and outlet electrical cabling.

BACKGROUND OF THE INVENTION

Branch connection plugs are used while performing maintenance operations on information transmission networks. While maintenance operations are being performed on the electrical cabling connected to the outlet side of a junction strip, such branch connection plugs serve to redirect the electrical signals that are carried by the electrical cabling connected to the inlet side of the junction strip to branch cabling (said inlet side cabling being referred to herein as the "inlet electrical cabling"). Thus, although maintenance operations are being performed on the electrical cabling connected to the outlet side of the strip, the electrical signals can continue to be transported to their destination by means of the branch cabling.

The junction strips conventionally used in information transmission networks such as telephone networks are known (in French) as "Pouyet" strips. These junction strips have a first face to which the inlet cabling is connected, in this case constituted by sixteen inlet channels, and a second face to which the outlet cabling is connected, forming sixteen outlet channels. Each inlet or outlet channel comprises first and second electrical conductors for transmitting information, together with a ground wire. A third face of the strip has sixteen removable continuity plugs, i.e. one per inlet channel for the purpose of establishing electrical continuity between one inlet channel and a corresponding outlet channel.

When the inlet cabling is to be redirected to branch cabling, the operators manually install branch connection plugs in the junction strip. These plugs have as many electrical contact fingers as there are electrical conductors in an inlet channel. When inserted in the junction strip, each contact finger is adapted to establish electrical contact with a respective conductor of the inlet channel. The branch connection plug is connected to a branch channel. This branch channel has as many electrical conductors as there are contact fingers in the branch connection plug, each of these conductors being connected to a respective contact finger.

Thus, when the branch connection plugs are installed, the contact fingers thereof establish electrical contact with respective conductors of an inlet channel, and the electrical signals conveyed over said inlet channel are directed to the branch connection connected to the branch connection plug. When a plurality of branch connection plugs are used, the set of branch channels connected to said plugs constitutes the branch cabling.

When all the inlet channels to a junction strip need to be directed to branch channels, the operator redirects the inlet channels to the branch channels one after another by inserting the branch connection plugs one after another into the junction strip. This operation is lengthy and tedious.

OBJECTS AND SUMMARY OF THE INVENTION

The invention seeks to remedy that drawback by proposing a device for redirecting a plurality of inlet channels of a junction strip to branch channels, more quickly.

The invention thus provides a branch comb as defined above, comprising at least two branch connection plugs secured to a common fixing plate with handle means for said fixing plate.

The above-described branch comb enables a plurality of branch connection plugs to be handled simultaneously. Thus, instead of performing branch connection plug installation operations one after another, it is possible to install the plugs simultaneously in a single operation. The operation of redirecting inlet cabling channels of the junction strip to channels of the branch cabling can thus be performed much more quickly.

According to other characteristics of a branch comb of the invention:

- only one of the branch connection plugs secured to the fixing plate includes a terminal for connection to a reference potential of the preexisting cabling, said reference potential then forming a common ground for the branch cabling;
- only two branch connection plugs have respective terminals for connection to a reference potential, said reference potential then forming a common reference potential for the branch cabling;
- the two branch connection plugs having respective terminals for connection to a reference potential are disposed at opposite ends of branch connection plugs that are not provided with terminals for connection to a reference potential;
- it includes a connector secured to the fixing plate for the purpose of establishing electrical connection between the branch cabling and the contact fingers of the branch connection plugs secured to the same fixing plate;
- it has at least ten branch connection plugs secured to the same fixing plate;
- the electrical junction strip is a "Pouylet" strip; and
- the handle means comprise a handle fixed to the fixing plate.

BRIEF DESCRIPTION OF THE DRAWINGS

The invention will be better understood on reading the following description given purely by way of example and made with reference to the drawings, in which.

MORE DETAILED DESCRIPTION

Figure 1:
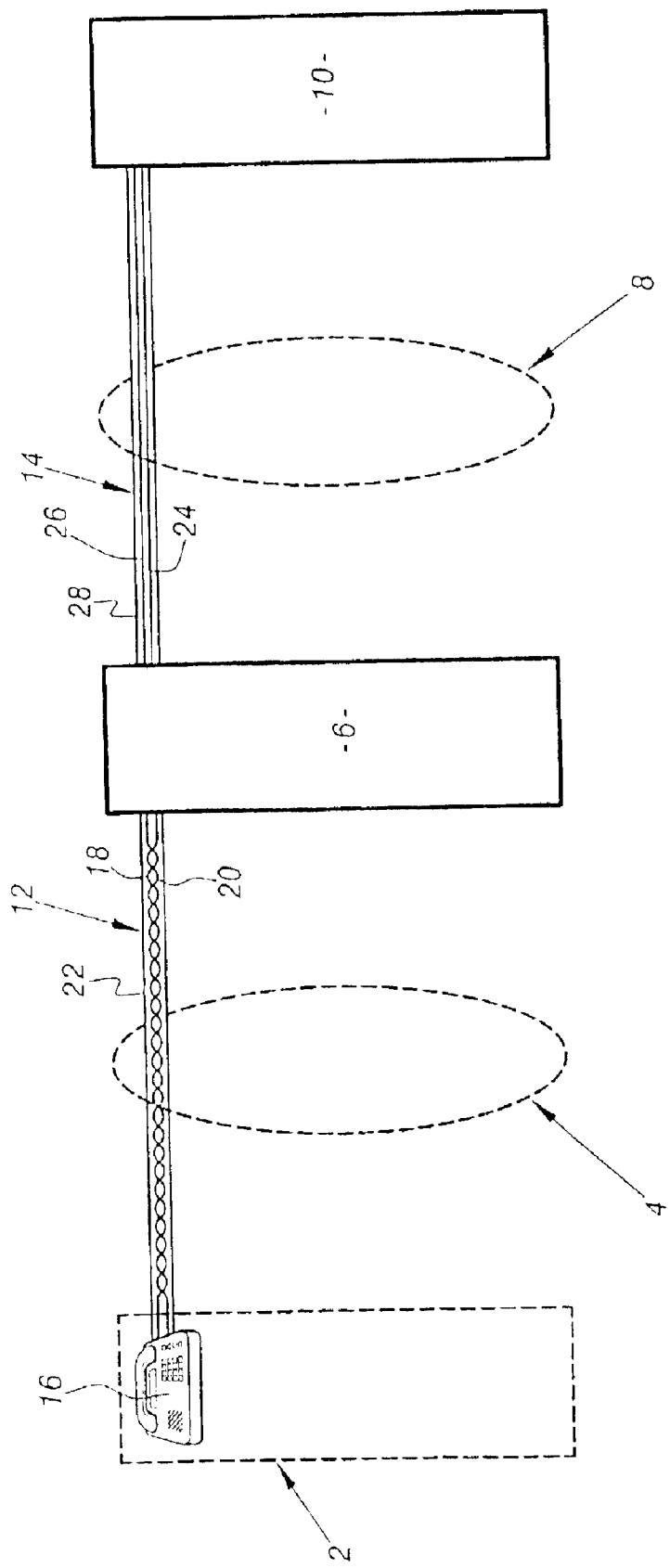
FIG. 1 is a diagrammatic illustration of an information transmission network using a conventional junction strip.

FIG. 1 shows telecommunications terminals 2 connected via inlet channels 4 to a junction strip 6, in turn connected via outlet channels 8 to a time division multiplexer 10.

The inlet channels 4 and the outlet channels 8 are similar to one another, so to simplify the figure only one inlet channel 12 and one outlet channel 14 are shown in full. Similarly, since the telecommunications terminals 2 are similar to one another, only one telecommunications terminal 16 is shown and described herein.

The telecommunications terminal 16 is connected to the inlet channel 12. It is suitable for transiting electrical signals over this inlet channel 12. By way of example, it is constituted by a conventional telephone.

The inlet channels 4 are all similar to the inlet channel 12. This channel comprises two electrical conductors 18 and 20 for transmitting information signals. These electrical conductors 18 and 20 are covered by a conductive layer 22 forming electromagnetic shielding. The conductors 18 and 20 and the shielding 22 are connected via their opposite ends firstly to the telecommunications terminal 16 and secondly to the junction strip 6. The detail of this connection is described with reference to FIG. 2.

The junction strip 6 is intended to establish electrical continuity between its inlet channels and its outlet channels. In the embodiment described herein, the junction strip is constituted by a "Pouyet" type strip.

The outlet channels 8 are all similar to the outlet channel 14. The channel 14 comprises two electrical conductors 24 and 26 for transporting the electrical signals interchanged between the time division multiplexer 10 and the telecommunications terminal 16. These conductors 24 and 26 are likewise covered in a conductive layer 28 forming electromagnetic shielding. This electromagnetic shielding 28 is connected via the junction strip 6 to the electromagnetic shielding 22.

The multiplexer 10 is also referred to as a "telecommunications cross-connector" and serves to direct the signals which reach it via the outlet channels 8 to numerous other telecommunications channels (not shown) available at its own outlet.

Figure 2:
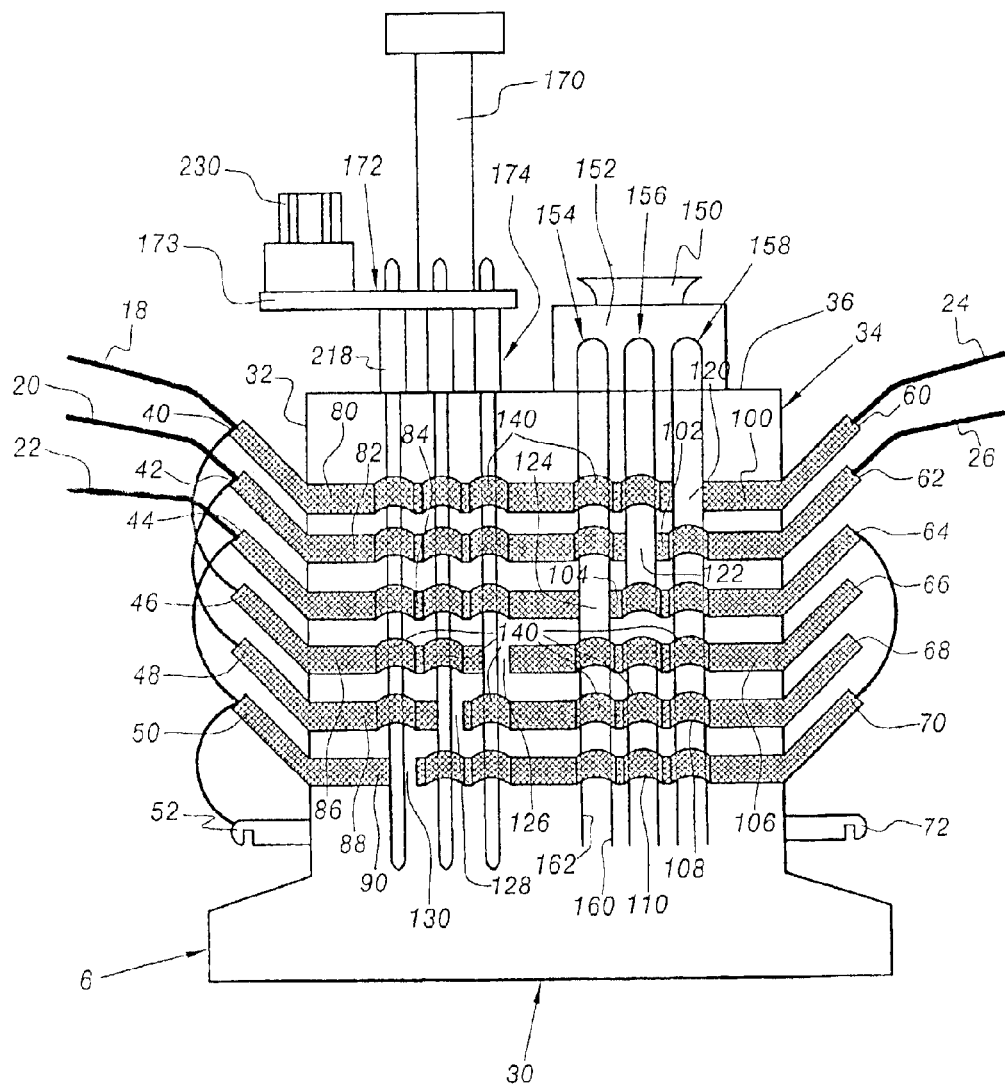
FIG. 2 is a diagrammatic view of a section of a "Pouyet" type junction strip.

FIG. 2 is a diagrammatic section view of the junction strip 6.

A junction strip is generally rectangular in shape, having a rear face 30 for fixing to a wall (not shown), two side faces 32 and 34, and a front face 36.

The side faces 32 and 34 carry connection terminals; The disposition of these terminals is identical on both faces 32 and 34, so the disposition of the terminals is described herein only for the side face 32.

This side face 32 carries sixteen parallel rows of connection terminals disposed in the length direction of the strip 6. Each row of connection terminals comprises six connection terminals and one ground terminal. The connection terminals are for connection to respective electrical conductors. In FIG. 2, only one row of connection terminals 40, 42, 44, 46, 48, 50, and 52 is shown on the side face 32 and only one row of terminals 60, 62, 64, 66, 68, 70, and 72 is shown on the side face 34. The rows of terminals disposed on the faces 32 and 34 of the junction strip face one another in pairs.

In the particular example described herein, the connection terminals of the side face 32 are connected as follows:

the terminal 40 is connected to the conductor 18 of the inlet channel 12 and to the terminal 46;

the terminal 42 is connected to the conductor 20 of the inlet channel 12 and to the terminal 48; and the terminal 44 is connected to the shielding 22 of the inlet channel 12 and to the terminals 50 and 52.

All of the rows on this side face 32 are connected in similar manner to respective inlet channels.

The connection terminals on the side face 34 are connected as follows:

the terminal 60 is connected to the conductor 24 of the outlet channel; and the terminal 62 is connected to the conductor 26 of the outlet channel 14.

Each connection terminal of the junction strip 6 is extended in a transverse plane to the inside of the strip 6 by a contact bar extending parallel to the front face 36. Each contact bar has an internal free end placed facing the internal free end of a contact bar belonging to one of the connection terminals situated on the opposite face. The two free ends placed facing each other are separated by an isolation gap of constant width. The connection terminals 40, 42, 44, 46, 48, and 50 are associated respectively with contact bars 80, 82, 84, 86, 88, and 90. The connection terminals 60, 62, 64, 66, 68, and 70 are associated respectively with contact bars 100, 102, 104, 106, 108, and 110.

The contact bars 80, 82, 84, 86, 88, and 90 are respectively in register with the contact bars 100, 102, 104, 106, 108, and 110, and they are separated from them by respective isolation gaps 120, 122, 124, 126, 128, and 130. The lengths of the contact bars are selected so as to offset the isolation gaps 120, 122, 124, 126, 128, and 130 from one another along a diagonal.

In the length direction, the front face 36 has formed therein sixteen parallel rows of six holes each (not shown) giving access to the isolation gaps. Each row of holes lies in a plane occupied by the rows of connection terminals situated facing each other on the two side faces 32 and 34. Each access hole gives access to a single corresponding isolation gap without touching any contact bars other than the bars forming said isolation gap. For this purpose, the contact bars are made in such a manner that only their free ends inside the junction strip are accessible from the access holes. Thus, in FIG. 2, bridges 140 that are all similar to one another are shown in the bodies of the access bars, these bridges being placed so as to leave access paths to the ends of the bars from the access holes situated in the front face 36. Each row of holes is designed to receive a continuity plug similar to the continuity plug 150 shown.

The continuity plug 150 is designed to establish electrical continuity between the three connection terminals disposed on the side face 32 and the corresponding three connection terminals disposed to the side face 34. For this purpose, it comprises a rigid support 152 having three identical electrical jumpers 154, 156, and 158 fixed thereto. The jumper 154 comprises two electrical pins 160 and 162 which are parallel to each other and which are connected to each other. These pins 160 and 162 serve respectively to make electrical contact with the respective free ends of two facing contact bars when the continuity plug is in its active position, i.e. when it is inserted in the junction strip, thereby establishing an electrical short between said free ends. In FIG. 2, the plug 150 is shown in its active position, and electrical continuity is established by said plug between the terminals 40 & 60, the terminals 42 & 62, and the terminals 44 & 64.

FIG. 2 also shows a branch connection comb 170 in its active position in the junction strip 6. This comb 170 is described in greater detail with reference to FIG. 3.

Figure 3:
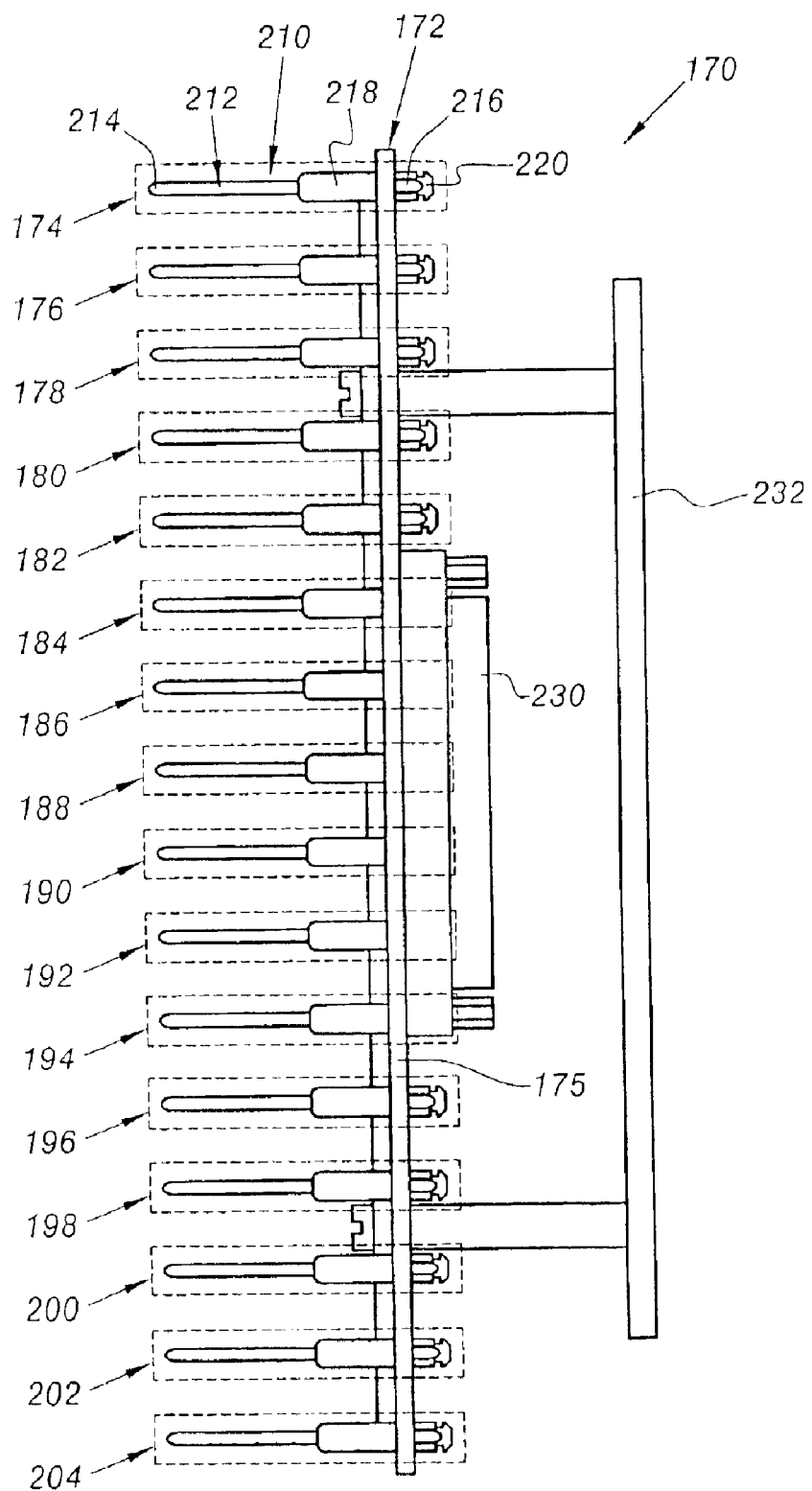
FIG. 3 is a side view of a branch connection comb in accordance with the invention.

FIG. 3 is a side view of the branch connection comb 170. This comb comprises a rigid rectangular fixing plate 172 having sixteen rows 174, 176, 178, 180, 182, 184, 186, 188, 190, 192, 194, 196, 198, 200, 202, and 204 of contact fingers fixed thereto. The length of the plate 172 is 16.7 centimeters (cm), and its maximum width is 3.4 cm. Each row is for connecting one inlet channel to one corresponding branch channel; for this purpose, a row thus functions as a branch connection plug. The rows are disposed parallel to one another so that the contact fingers forming each of the rows can be inserted simultaneously into the corresponding access holes in the front face 36 of the junction strip 6. The rows are thus parallel in this case to the short side 173 of the fixing plate 172 (FIG. 2) and they are disposed at regular intervals along the long side 175 (FIG. 3) thereof.

The end rows 174 and 204 are disposed at respective ends of the fixing plate 172. The other rows 176 to 202 are referred to as intermediate rows and they are disposed in the interval between the two end rows 174 and 204.

The intermediate rows are similar to the end rows except that they have only two contact fingers instead of three as are provided in the end rows. The missing contact finger compared with the end rows corresponds to the finger that would come into contact with the reference or shielding potential of the inlet channel. This makes it easier to insert the comb 170 into the junction strip. Furthermore, the fingers making contact with the shielding of the inlet channels are conserved only in the end rows since these rows also serve to guide and position the comb 170 relative to the access holes in the front face 36 of the junction strip.

Since the row 174 of contact fingers is similar to the row 204, only the row 174 is described herein.

The end row 174 has three contact fingers each designed to be inserted in a respective access hole in the front face 36 so as to make contact with the end of a single contact bar beside the side face 32 of the junction strip. The three contact fingers of the end row 174 are in alignment parallel with the short side of the fixing plate 172. Since these contact fingers are identical to one another, only the contact finger 210 is described herein. The contact finger 210 is at least 6.1 cm long. In this case, the contact finger is 7.1 cm long and comprises a rectilinear metal pin 212 having a free end 214 and a fixing end 216. The fixing end 216 is threaded. The contact finger 210 also has a lock nut 218 and a nut 222 forming means for securing the contact finger to the fixing plate 172. The lock nut 218 and the nut 220 are designed to be mounted on the fixing end 216 so as to clamp the fixing plate 172 between them. For this purpose, fixing holes for the contact fingers are made through the fixing plate 172. Each fixing hole is to receive the fixing end of a corresponding contact finger.

An electrical connector 230 has thirty-four female sockets, i.e. as many sockets as there are contact fingers, and it is fixed to the fixing plate 172. This connector is suitable for enabling the entire cabling of the branch connection to be connected to the comb 170 in a single operation. Each female socket of the connector is connected to a corresponding contact finger by means of a printed circuit made for this purpose on the fixing plate 172. Each female socket 230 is designed to be connected to a corresponding conductor of the branch cabling (not shown). The ground or reference potential of the branch cabling is connected to the corresponding female sockets of the end rows 174 and 204.

A handle 232 is fixed to the fixing plate 172 to enable an operator to hold the fixing plate 172 while inserting or extracting the contact fingers into or out from the junction strip 6.

The function of the branch connection comb is described below with reference to FIGS. 2 and 3.

When all of the inlet channels 4 connected to the side face 32 of the junction strip 6 are to be redirected to branch cabling, an operator takes hold of the comb 170 by its handle 232 and places the contact fingers of the end rows 174 and 204 into register with the respective access holes formed in the front face 36. Thereafter, still using the handle 232, the operator exerts insertion force which is transmitted via the fixing plate to each of the contact fingers, the contact fingers then penetrating simultaneously into the access holes. The operator pushes the contact fingers into the inside of the junction strip until the lock nuts 218 come into abutment against the front face 36 of the strip. In this "active" position, the pins of each of the contact fingers make electrical contact with the respective ends of the contact bars situated beside the side face 32. Since the mechanisms for redirecting the inlet channels 4 are similar to one another, only the mechanism for redirecting the inlet channel 12 to a branch connection channel (not shown) is described herein for the particular case in which the inlet channel 12 is redirected via the end row 174 of the comb 170.

When the comb 170 is in its active position, the three contact fingers of the end row 174 make contact respectively solely with respective ones of the ends of the contact bars 86, 88, and 90.

In this situation, electrical continuity between the conductor 18 and the female socket of the connector 230 is established via the connection terminal 40, the connection terminal 46, the contact bar 86, and one of the pins in the end row 174 of the comb 170. Similarly, electrical contact between the conductor 20 and another female socket of the connector 230 is also established.

In the special case of an end row, a third electrical circuit connects the ground terminal 52 to the connection terminal 50 which is extended by the contact bar 90 whose end comes into contact with the third pin of the end row 174. Thus, the electrical signals carried by the conductors 18 and 20 are redirected via the contact fingers to respective female sockets of the connector 230, while ground potential is connected to the reference potential of the branch cabling via the terminal 50, the bar 90, and the corresponding pin.

Thereafter, the operator connects the branch channels to the inlet channels by means of the connector 230.

Finally, the operator removes all of the continuity plugs such as the continuity plug 150. Once this last step has been performed, the inlet channels are no longer connected to the outlet channels but are connected solely to the branch channels.

In a variant, to further facilitate insertion of the contact fingers of the comb 170 in the junction strip, only one of the two end rows of contact fingers has a contact finger for making contact with the ground terminal common to the inlet channels.

What is claimed:

1. A comb for making a branch connection to preexisting cabling in a telephone network, comprising:
   a common fixing plate;
   a handle means for said fixing plate; and
   at least two branch connection plugs secured to the common fixing plate,
   each of said branch connection plugs comprising a row of contact fingers insertable in an electrical junction strip of the telephone network to connect preexisting cabling to branch cabling, wherein the electrical junction strip is a Pouyet strip designed to establish electrical continuity between inlet electrical cabling and outlet electrical cabling.

2. A comb according to claim 1, wherein only one of the branch connection plugs includes a terminal for connection to a reference potential of the preexisting cabling, the reference potential then forming a common ground for the branch cabling.

3. A comb according to claim 1, wherein only two of said branch connection plugs have respective terminals for connection to a reference potential so that the reference potential forms a common reference potential for the branch cabling.

4. A comb according to claim 3, wherein the two branch connection plugs having respective terminals for connection to the reference potential are disposed at opposite ends of branch connection plugs that are not provided with terminals for connection to the reference potential.

5. A comb according to claim 1, further comprising:
a connector secured to the fixing plate for establishing electrical connection between the branch cabling and the contact fingers of the branch connection plugs.

6. A comb according to claim 1, having at least ten branch connection plugs secured to the common fixing plate.

7. A comb according to claim 1, wherein the handle means comprises a handle fixed to the fixing plate.

8. A comb according to claim 5, further comprising:
a printed circuit made on the fixing plate, and
wherein the connector is connected to the contact fingers by the printed circuit.

9. A method of making a branch connection to preexisting cabling in a telephone network utilizing the comb of claim 1, comprising the steps of:
connecting branch cabling to the comb; and
installing the comb in a junction strip.

10. A method according to claim 9, comprising the further step of removing a set of continuity jumpers previously inserted in the junction strip, each continuity jumper being designed to establish electrical continuity between an inlet electrical channel and an outlet electrical channel.

11. A connection system, comprising:
a cabling in a telephone network having an inlet electrical cabling connected to a telecommunication terminal and an outlet electrical cabling connected to a time division multiplexer;
an electrical junction strip in the telephone network establishing electrical continuity between the inlet electrical cabling and the outlet electrical cabling; and
a comb for making a branch connection to the cabling, the comb comprising
a common fixing plate,
a handle means for said fixing plate, and
at least two branch connection plugs secured to the common fixing plate,
each of said branch connection plugs comprising a row of contact fingers insertable in an electrical junction strip of the telephone network to connect preexisting cabling to branch cabling, wherein the electrical junction strip is designed to establish electrical continuity between inlet electrical cabling and outlet electrical cabling.

12. A comb according to claim 11, wherein only one of the branch connection plugs includes a terminal for connection to a reference potential of the preexisting cabling, the reference potential then forming a common ground for the branch cabling.

13. A comb according to claim 11, wherein only two of said branch connection plugs have respective terminals for connection to a reference potential, the reference potential then forming a common reference potential for the branch cabling.

14. A comb according to claim 13, wherein the two branch connection plugs having respective terminals for connection to the reference potential are disposed at opposite ends of branch connection plugs that are not provided with terminals for connection to the reference potential.

15. A comb according to claim 11, further comprising:
a connector secured to the fixing plate for establishing electrical connection between the branch cabling and the contact fingers of the branch connection plugs.

16. A comb according to claim 11, having at least ten branch connection plugs secured to the common fixing plate.

17. A comb according to claim 11, wherein the handle means comprises a handle fixed to the fixing plate.

18. A comb according to claim 15, further comprising:
a printed circuit made on the fixing plate, and
wherein the connector is connected to the contact fingers by the printed circuit.

19. A branch connection comb, comprising:
a rigid rectangular fixing plate with fixing holes;
plural rows of contact fingers fixedly mounted, via the fixing holes, on the fixing plate and insertable in an electrical junction strip of a telephone network to connect preexisting cabling to branch cabling to establish electrical continuity between inlet electrical cabling and outlet electrical cabling,
the rows of contact fingers being disposed parallel to one another so that the contact fingers forming each of the rows are simultaneously insertable into corresponding access holes of the junction strip,
each row of contact fingers connecting one inlet channel to one corresponding branch channel, wherein,
the plural rows of contact fingers comprises two end rows disposed at respective ends of the fixing plate and intermediate rows disposed in an interval between the two end rows,
the intermediate rows have exactly two contact fingers, and
the two end rows have exactly three contact fingers.

20. The comb of claim 19, wherein the rows of contact fingers are parallel to a short side of the fixing plate and they are disposed at regular intervals along a long side of the fixing plate.

21. The comb of claim 19, wherein a finger of each end row, in operation, comes into contact with a reference or shielding potential of the inlet channel and no finger of the intermediate rows, in operation, comes into contact with the reference or shielding potential of the inlet channel.

22. A branch connection comb, comprising:
a rigid rectangular fixing plate with fixing holes;
plural rows of contact fingers fixedly mounted, via the fixing holes, on the fixing plate and insertable in an electrical junction strip of a telephone network to connect preexisting cabling to branch cabling to establish electrical continuity between inlet electrical cabling and outlet electrical cabling,
the rows of contact fingers being disposed parallel to one another so that the contact fingers forming each of the rows are simultaneously insertable into corresponding access holes of the junction strip,
each row of contact fingers connecting one inlet channel to one corresponding branch channel, wherein,
end rows of the contact fingers are in alignment parallel with a short side of the fixing plate,
each contact finger of the end rows is at least 6.1 cm long and comprises a rectilinear metal pin having a free end and a threaded fixing end,
the contact finger further having a lock nut set securing the contact finger to the fixing plate, through the fixing holes, with the lock nut set mounted on the fixing end and clamping the fixing plate between elements of the lock nut set.

23. The comb of claim 22, wherein the comb includes sufficient contact fingers to engage all sockets of an electrical connector having thirty-four female sockets, to enable the entire cabling of the branch connection to be connected to the comb in a single operation.

24. The comb of claim 23, further comprising a printed circuit board on the fixing plate, each female socket of the connector connectable to a corresponding contact finger by means of the printed circuit.

25. The comb of claim 22, further comprising a handle fixed to the fixing plate enabling an operator to hold the fixing plate while inserting the contact fingers into or out from the junction strip, wherein, the operator holds the comb by the handle and places the contact fingers of end rows into register with the respective access holes formed in a front face of the junction strip, and thereafter, still holding the handle, the operator exerts insertion force which is transmitted via the fixing plate to each of the contact fingers, the contact fingers then penetrating simultaneously into the access holes.

* * * * *